(12) United States Patent
Kim et al.

(10) Patent No.: US 9,730,202 B2
(45) Date of Patent: Aug. 8, 2017

(54) METHOD AND DEVICE FOR MONITORING DOWNLINK CONTROL CHANNEL

(71) Applicant: LG ELECTRONICS INC., Seoul (KR)

(72) Inventors: Hakseong Kim, Seoul (KR); Hanbyul Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 14/442,463

(22) PCT Filed: Nov. 14, 2013

(86) PCT No.: PCT/KR2013/010363
§ 371 (c)(1),
(2) Date: May 13, 2015

(87) PCT Pub. No.: WO2014/077608
PCT Pub. Date: May 22, 2014

(65) Prior Publication Data
US 2016/0255609 A1 Sep. 1, 2016

Related U.S. Application Data

(60) Provisional application No. 61/726,520, filed on Nov. 14, 2012, provisional application No. 61/727,059, (Continued)

(51) Int. Cl.
*H04J 11/00* (2006.01)
*H04W 72/04* (2009.01)
(Continued)

(52) U.S. Cl.
CPC ........ *H04W 72/042* (2013.01); *H04B 7/0413* (2013.01); *H04J 11/00* (2013.01);
(Continued)

(58) Field of Classification Search
CPC ..... H04W 72/042; H04W 48/16; H04J 13/16; H04J 11/00; H04B 7/0413
See application file for complete search history.

(56) References Cited

U.S. PATENT DOCUMENTS

2006/0203710 A1 9/2006 Mukkavilli et al.
2006/0239457 A1 10/2006 Ridler et al.
(Continued)

FOREIGN PATENT DOCUMENTS

EP 2426830 A2 3/2012
KR 10-2006-0112174 A 10/2006
(Continued)

OTHER PUBLICATIONS

Intel Corporation, "EPDCCH scrambling sequence generation," 3GPP TSG-RAN WG1 Meeting #70bis, R1-124121, San Diego, USA, Oct. 8-12, 2012, 6 pgs.

*Primary Examiner* — Ian N Moore
*Assistant Examiner* — Phong La
(74) *Attorney, Agent, or Firm* — Birch, Stewart, Kolasch & Birch, LLP

(57) ABSTRACT

A method for monitoring a control channel in a wireless communication system and a wireless device using the same are provided. The wireless device monitors a downlink control channel in at least one physical resource block (PRB) pair of a subframe that is assigned for an enhanced physical downlink control channel (EPDCCH) set. A beat-stream for downlink control information of the downlink control channel is scrambled by a scrambling sequence that is initialized on the basis of a scrambling initialization value allocated to the EPDCCH set.

12 Claims, 23 Drawing Sheets

Related U.S. Application Data filed on Nov. 15, 2012, provisional application No. 61/729,636, filed on Nov. 26, 2012.

(51) Int. Cl.
| | | |
|---|---|---|
| *H04W 48/16* | (2009.01) | |
| *H04J 13/16* | (2011.01) | |
| *H04B 7/0413* | (2017.01) | |
| *H04L 5/00* | (2006.01) | |
| *H04L 25/03* | (2006.01) | |
| *H04L 12/70* | (2013.01) | |

(52) U.S. Cl.
CPC .............. *H04J 13/16* (2013.01); *H04L 5/00* (2013.01); *H04L 25/03866* (2013.01); *H04W 48/16* (2013.01); *H04L 2012/5673* (2013.01); *H04W 72/0406* (2013.01)

(56) References Cited

U.S. PATENT DOCUMENTS

| | | | | |
|---|---|---|---|---|
| 2011/0134849 A1* | 6/2011 | Lee | ............... | H04B 7/0671 370/328 |
| 2011/0283171 A1* | 11/2011 | Siew | ............... | H04L 1/0079 714/807 |
| 2012/0033647 A1 | 2/2012 | Moon et al. | | |
| 2012/0275400 A1 | 11/2012 | Chen et al. | | |
| 2013/0022012 A1 | 1/2013 | Lee et al. | | |
| 2013/0194931 A1* | 8/2013 | Lee | ............... | H04L 5/0053 370/241 |
| 2013/0195067 A1* | 8/2013 | Khoshnevis | ............... | H04L 5/0094 370/330 |
| 2013/0294368 A1* | 11/2013 | Bendlin | ............... | H04W 72/042 370/329 |
| 2013/0294369 A1* | 11/2013 | Dinan | ............... | H04L 5/001 370/329 |
| 2013/0301549 A1* | 11/2013 | Chen | ............... | H04W 76/048 370/329 |
| 2014/0355531 A1* | 12/2014 | Han | ............... | H04L 27/2613 370/329 |
| 2015/0078328 A1* | 3/2015 | Tang | ............... | H04L 5/0023 370/330 |

FOREIGN PATENT DOCUMENTS

| | | |
|---|---|---|
| KR | 10-20090123922 A | 12/2009 |
| KR | 10-2011-0113596 A | 10/2011 |
| WO | WO 2012/043955 A1 | 4/2012 |
| WO | WO 2012/108928 A1 | 8/2012 |

* cited by examiner

METHOD AND DEVICE FOR MONITORING DOWNLINK CONTROL CHANNEL

CROSS REFERENCE TO RELATED APPLICATIONS

This application is the National Phase of PCT International Application No. PCT/KR2013/010363, filed on Nov. 14, 2013, which claims priority under 35 U.S.C. 119(e) to U.S. Provisional Application Nos. 61/726,520, filed on Nov. 14, 2012, 61/727,059, filed on Nov. 15, 2012 and 61/729, 636, filed on Nov. 26, 2012, all of which are hereby expressly incorporated by reference into the present application.

BACKGROUND OF THE INVENTION

Field of the Invention

The present invention relates to wireless communications, and more particularly, to a method of monitoring a downlink control channel in a wireless communication system, and a wireless device using the method.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To cope with increasing data traffic, various techniques are introduced to increase transmission capacity of a mobile communication system. For example, a multiple input multiple output (MIMO) technique using multiple antennas, a carrier aggregation technique supporting multiple cells, etc., are introduced.

The PDCCH designed in 3GPP LTE/LTE-A carries a variety of control information. The introduction of a new technology requires to increase capacity of the control channel and to improve scheduling flexibility.

SUMMARY OF THE INVENTION

The present invention provides a method of monitoring a downlink control channel, and a wireless device using the method.

The present invention also provides a method of transmitting downlink control information, and a base station using the method.

In an aspect, a method for monitoring a control channel in a wireless communication system is provided. The method includes monitoring, by a wireless device, a downlink control channel in at least one physical resource block-pair of a subframe that is assigned for an enhanced physical downlink control channel (EPDCCH) set. A bit stream for downlink control information on the downlink control channel is scrambled with a scrambling sequence that is initialized based on a scrambling initialization value assigned for the EPDCCH set.

The scrambling sequence may be obtained from a pseudo-random sequence, and the pseudo random-sequence may initialized with $c_{init}=(\text{floor}(ns/2))2^9+n_i$, where ns denotes a slot number within a radio frame, floor (x) denotes a largest integer not greater than x, and $n_i$ denotes the scrambling initialization value assigned for the EPDCCH set.

The step of monitoring the downlink control channel may include demodulating the downlink control information on the downlink control channel to obtain the bit stream for the downlink control information, and descrambling the bit stream for the downlink control information with the scrambling sequence.

The method may further include receiving, by the wireless device, configuration information to configure the EPDCCH set from a base station. The configuration information may include a resource assignment indicating the at least one physical resource block-pair and scrambling initialization information indicating the scrambling initialization value.

In another aspect, a device configured to monitor a control channel in a wireless communication system is provided. The device includes a processor, and a memory operatively coupled with the processor and storing instructions that when executed by the processor causes to the device to monitor a downlink control channel in at least one physical resource block-pair of a subframe that is assigned for an enhanced physical downlink control channel (EPDCCH) set. A bit stream for downlink control information on the downlink control channel is scrambled with a scrambling sequence that is initialized based on a scrambling initialization value assigned for the EPDCCH set.

In still another aspect, a method for transmitting downlink control information in a wireless communication system is provided. The method includes generating a bit stream for downlink control information, generating a scrambling sequence, scrambling the bit stream for the downlink control information with the scrambling sequence, and transmitting the scrambled bit stream in at least one physical resource block-pair of a subframe that is assigned for an enhanced physical downlink control channel (EPDCCH) set. The scrambling sequence is initialized based on a scrambling initialization value assigned for the EPDCCH set.

Even if a plurality of search spaces are configured in one subframe, a wireless device can monitor a corresponding downlink control channel.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
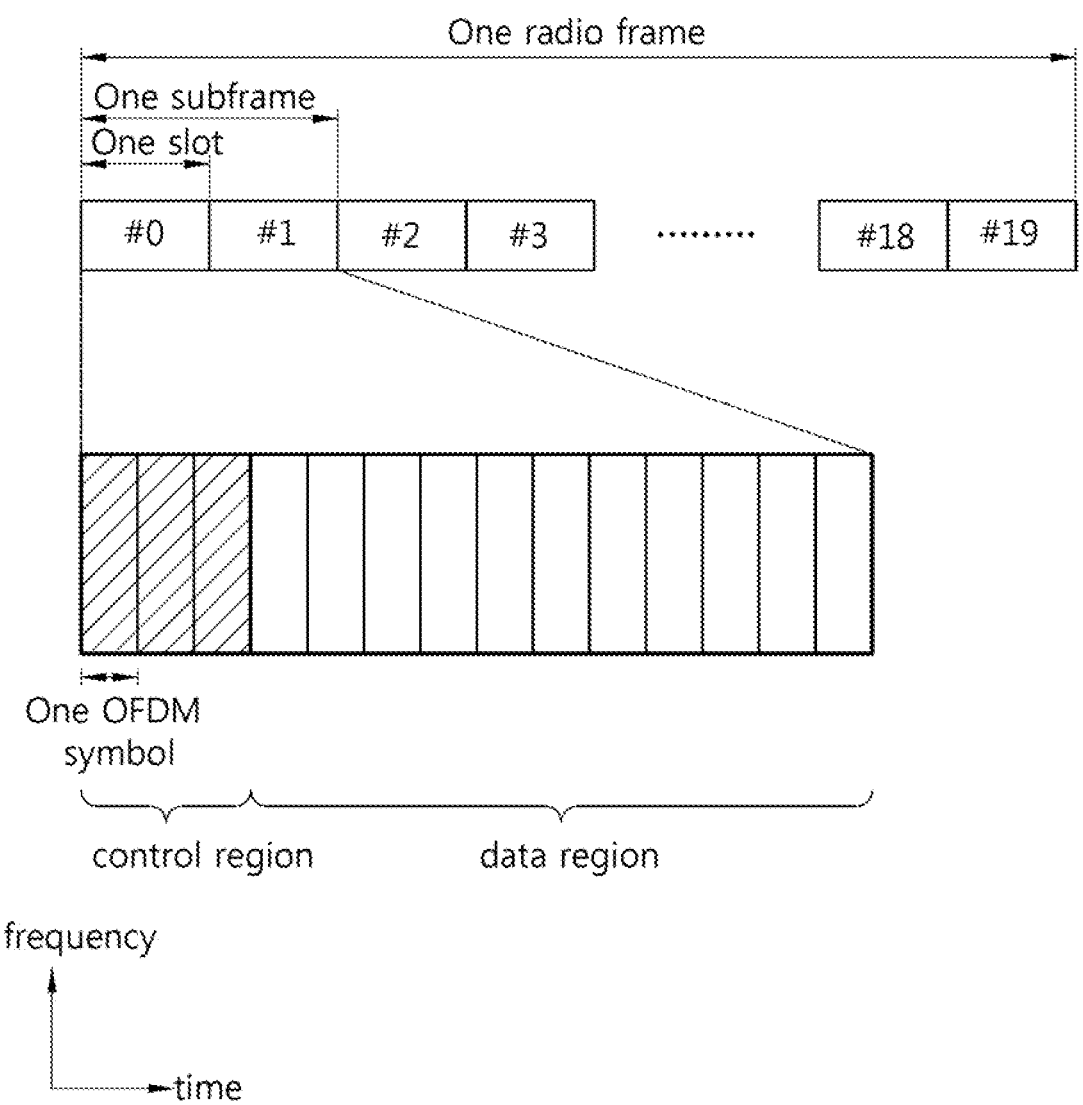
FIG. 1 shows a structure of a downlink (DL) radio frame in $3^{rd}$ generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
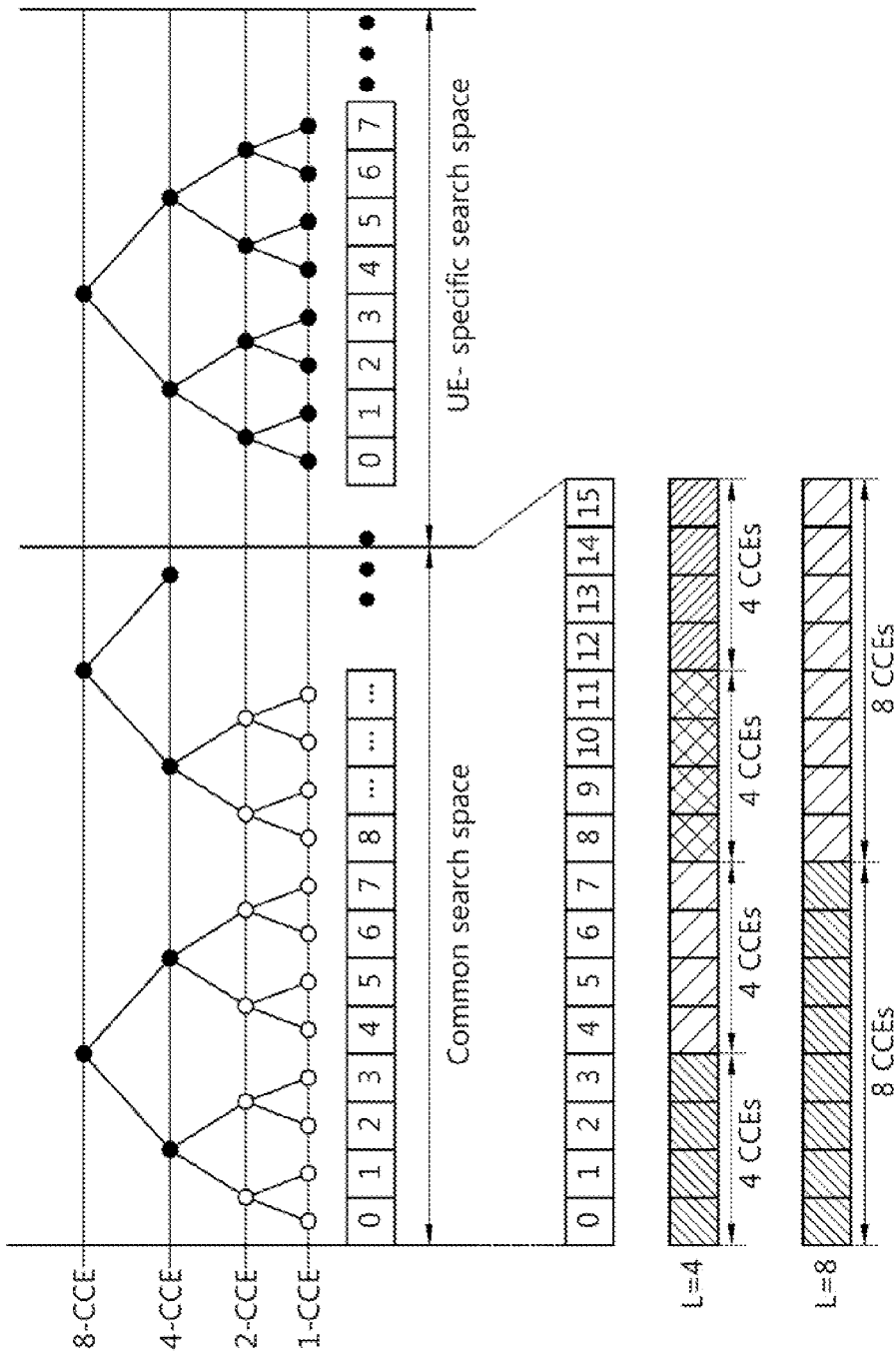
FIG. 2 shows an example of monitoring a physical downlink control channel (PDCCH) in 3GPP LTE.

FIG. 2 is a block diagram showing a structure of a PDCCH. The section 9 of 3GPP TS 36.213 V10.2.0 (2011-06) may be incorporated herein by reference.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH.

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

A start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

Figure 3:
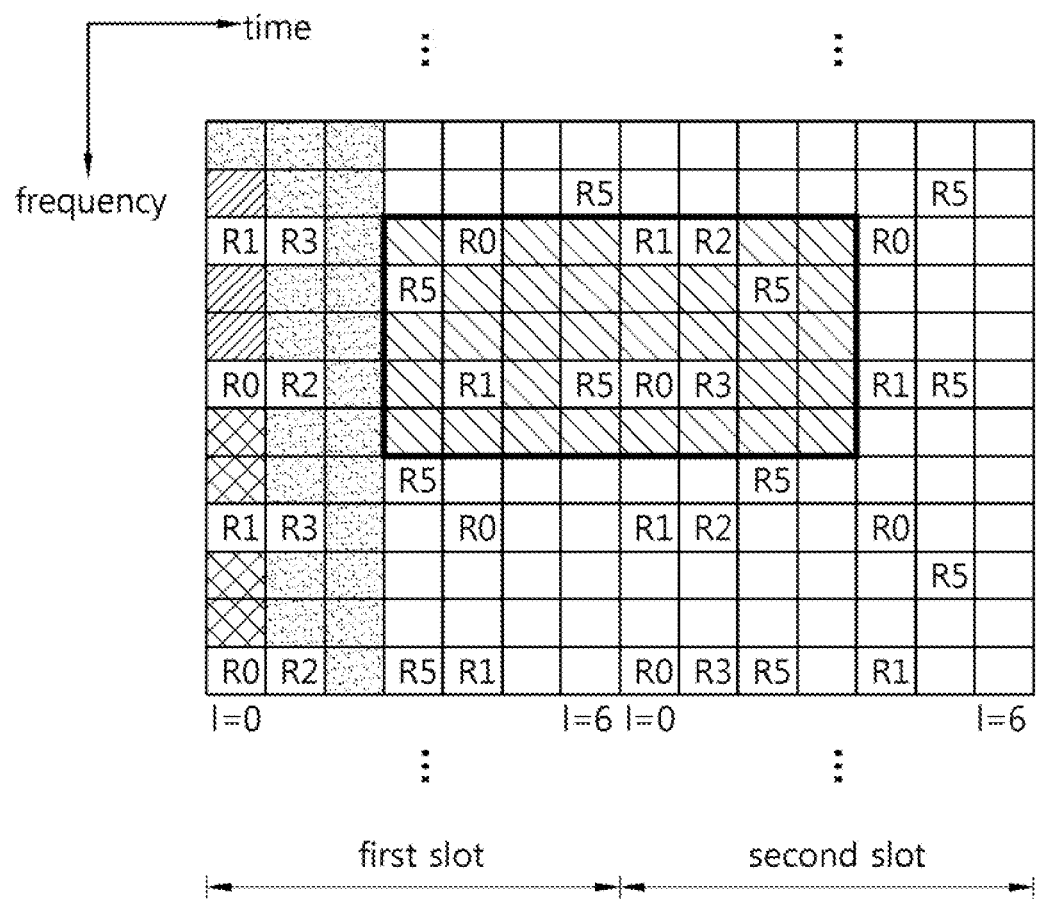
FIG. 3 shows an example of arranging a reference signal and a control channel in a DL subframe of 3GPP LTE.

FIG. 3 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

Figure 4:
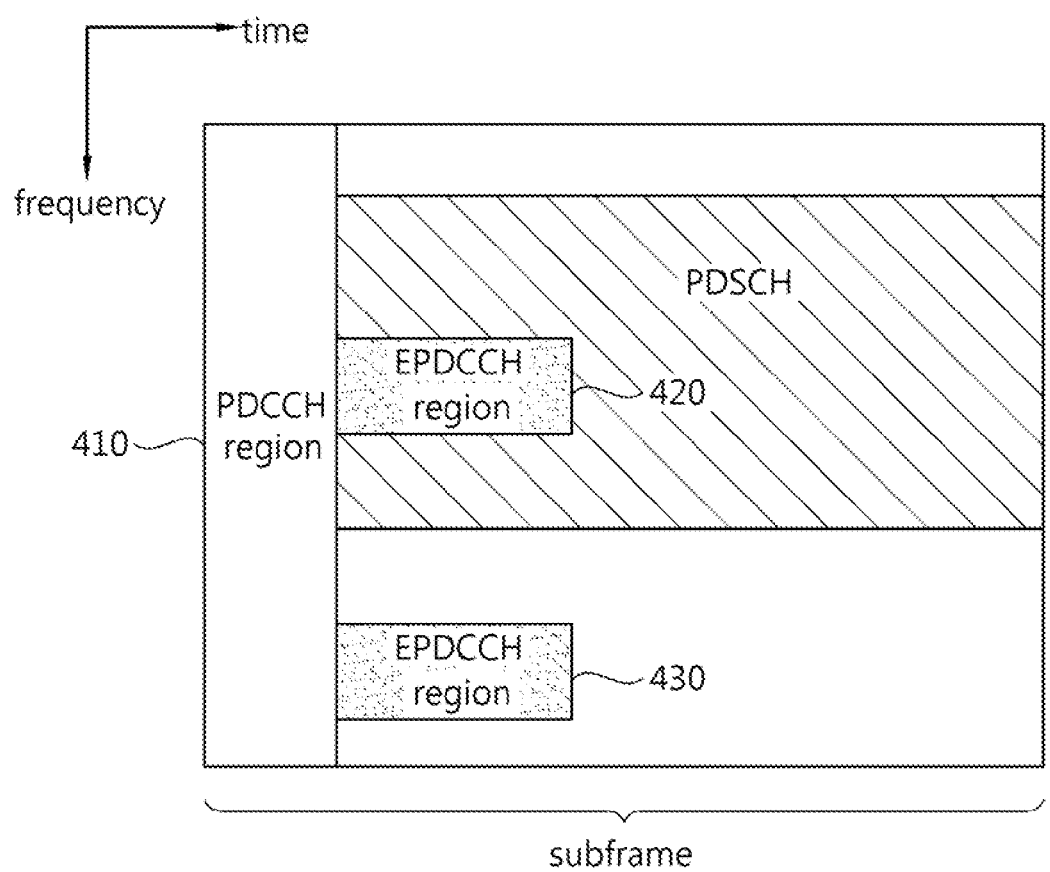
FIG. 4 is an example of a subframe having an enhanced PDCCH (EPDCCH).

A cell-specific reference signal (CRS) may be received by all wireless devices in a cell, and is transmitted across a full downlink frequency band. In FIG. 4, 'R1' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

Herein, m=0, 1, ..., $2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 2]}$$

Herein, Nc=1600, and a first m-sequence is initialized as $x_1(0)=1$, $x_1(n)=0$, m=1, 2, ..., 30.

A second m-sequence is initialized as $c_{init}=2^{10}(7(ns+1)+1+1)(2N^{cell}_{ID}+)+2\ N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, m=0, 1, ..., $12N_{PDSCH,RB}-1$, and $N_{PDSCH,RB}$ is the number of RBs used for transmission of a corresponding PDSCH. A pseudo-random sequence generator is initialized as $c_{init}=$ (floor(ns/2)+1)(2 $N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}$ (floor(ns/2)+1)(2 $N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

FIG. 4 is an example of a subframe having an EPDCCH.

A subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

The BS can provide to the wireless device information about the starting OFDM symbol at which the EPDCCH regions 420 and 430 are started via a RRC message or a CFI.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 1. In this case, m=0, 1, ..., $12N_{RB}-1$, and $N_{RB}$ is a maximum number of RBs. A pseudo-random sequence generator may be initialized as $c_{init}=$(floor(ns/2)+1)(2 $N_{EPDCCH,ID}+1)216+n_{EPDCCH,SCID}$ at a start of each subframe. ns is a slot number of a radio frame. $N_{EPCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

A search space may corresponds to a EPDCCH region. The search space may corresponds to a EPDCCH set. In the search space, one or more EPDCCH candidates can be monitored in one or more aggregation level.

Now, resource allocation for an EPDCCH will be described.

The EPDCCH is transmitted by using one or more ECCEs. The ECCE includes a plurality of enhanced resource element groups (EREGs). According to a CP and a subframe type based on a time division duplex (TDD) DL-UL configuration, the ECCE may include 4 EREGs or 8 EREGs. For example, the ECCE may include 4 EREGs in a normal CP case, and may include 8 EREGs in an extended CP case.

A physical resource block (PRB) pair is 2 PRBs having the same RB number in one subframe. The PRB pair is a 1st PRB of a 1st slot and a 2nd PRB of a 2nd slot in the same frequency domain. In the normal CP case, the PRB pair includes 12 subcarriers and 14 OFDM symbols, and thus includes 168 resource elements (REs).

Figure 5:
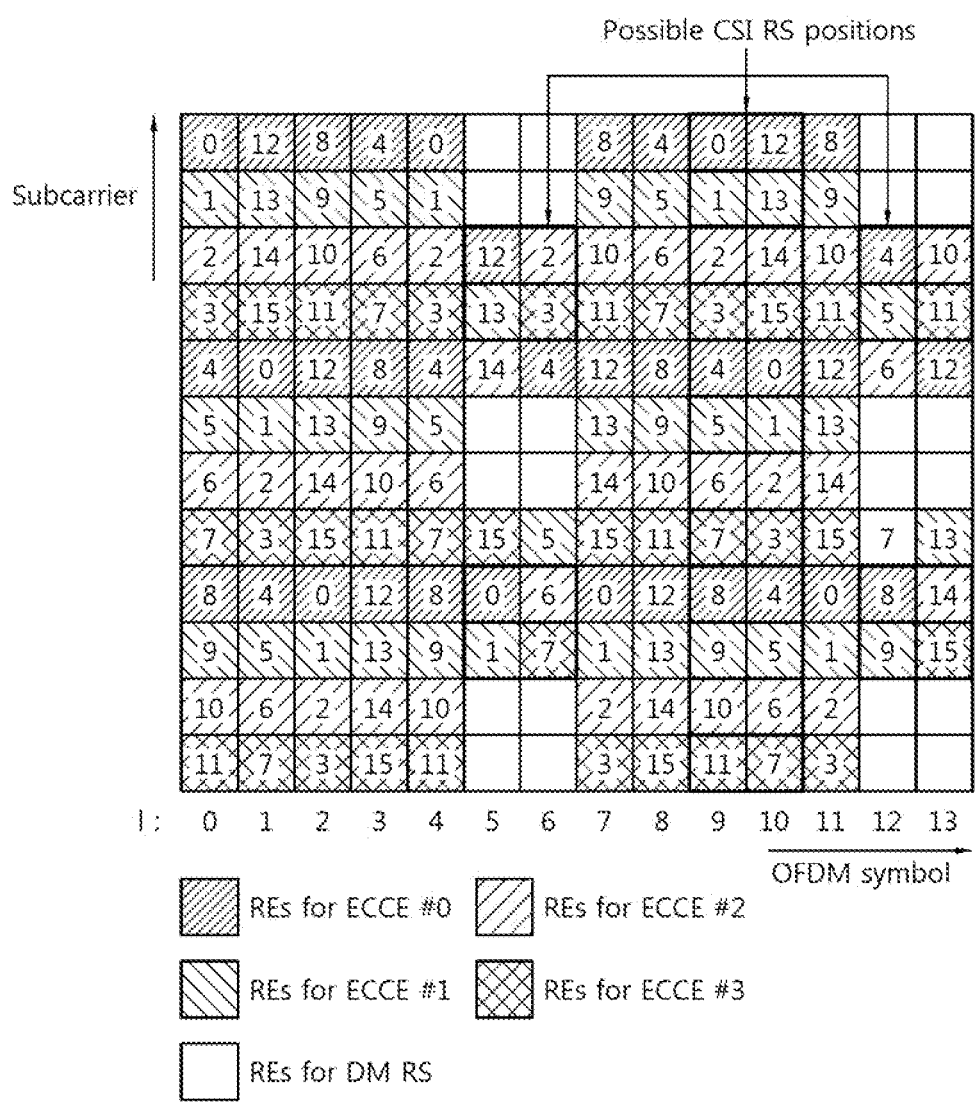
FIG. 5 shows an example of a physical resource block (PRB) pair.

FIG. 5 shows an example of a PRB pair. Although it is assumed hereinafter that a subframe includes 2 slots and a PRB pair in one slot includes 7 OFDM symbols and 12 subcarriers, the number of OFDM symbols and the number of subcarriers are for exemplary purposes only.

In one subframe, the PRB pair includes 168 REs in total. 16 EREGs are configured from 144 REs, except for 24 REs for a DM RS. Therefore, 1 EREG may include 9 REs. However, a CRS-RS or a CRS may be placed to one PRB pair, in addition to the DM RS. In this case, the number of available REs may be decreased, and the number of REs included in 1 EREG may be decreased. The number of REs included in the EREG may be changed, whereas there is no change in the number (i.e., 16) of EREGs included in one PRB pair.

In this case, as shown in FIG. 5, an RE index may be assigned sequentially starting from a first subcarrier of a first OFDM symbol (1=0). Assume that 16 EREGs are indexed from 0 to 15. In this case, 9 REs having an RE index 0 are assigned to an EREG 0. Likewise, 9 REs corresponding to an RE index k (k=0, ..., 15) are assigned to an EREG k.

An EREG group is defined by aggregating a plurality of EREGs. For example, if an EREG group having 4 EREGs is defined, it may be defined as an EREG group #0={EREG 0, EREG 4, EREG 8, EREG 12}, an EREG group #1={EREG 1, EREG 5, EREG 9, EREG 3}, an EREG group #2={EREG 2, EREG 6, EREG 10, EREG 14}, and an EREG group #3={EREG 3, EREG 7, EREG 11, EREG 15}. If an EREG group having 8 EREGs is defined, it may be defined as an EREG group #0={EREG 0, EREG 2, EREG 4, EREG 6, EREG 8, EREG 10, EREG 12, EREG 14} and an EREG group #1={EREG 1, EREG 3, EREG 5, EREG 7, EREG 9, EREG 11, EREG 13, EREG 15}.

As described above, the ECCE may include 4 EREGs. In an extended CP case, the ECCE may include 8 EREGs. The ECCE is defined by the EREG group. For example, it is exemplified in FIG. 9 that an ECCE #0 includes an EREG group #0, an ECCE #1 includes an EREG group #1, an ECCE #2 includes an EREG group #2, and an ECCE #3 includes an EREG group #3.

ECCE-to-EREG mapping has two types of transmission, i.e., localized transmission and distributed transmission. In the localized transmission, an EREG group constituting one ECCE is selected from EREGs of one PRB pair. In the distributed transmission, an EREG constituting one ECCE is selected from EREGs of different PRB pairs.

For clarity, units of the search space to monitor a DL control channel may be classified into ECCE, EREG and RE. A ECCE may include 8 EREG or 4 EREG. This is exemplary purpose only. A search space can be referred to as a first search unit (or first allocation unit), a second search unit, a third search unit, etc.

Now, generating of a scrambling sequence and transmitting of a control channel will be described according to the proposed embodiment.

Figure 6:
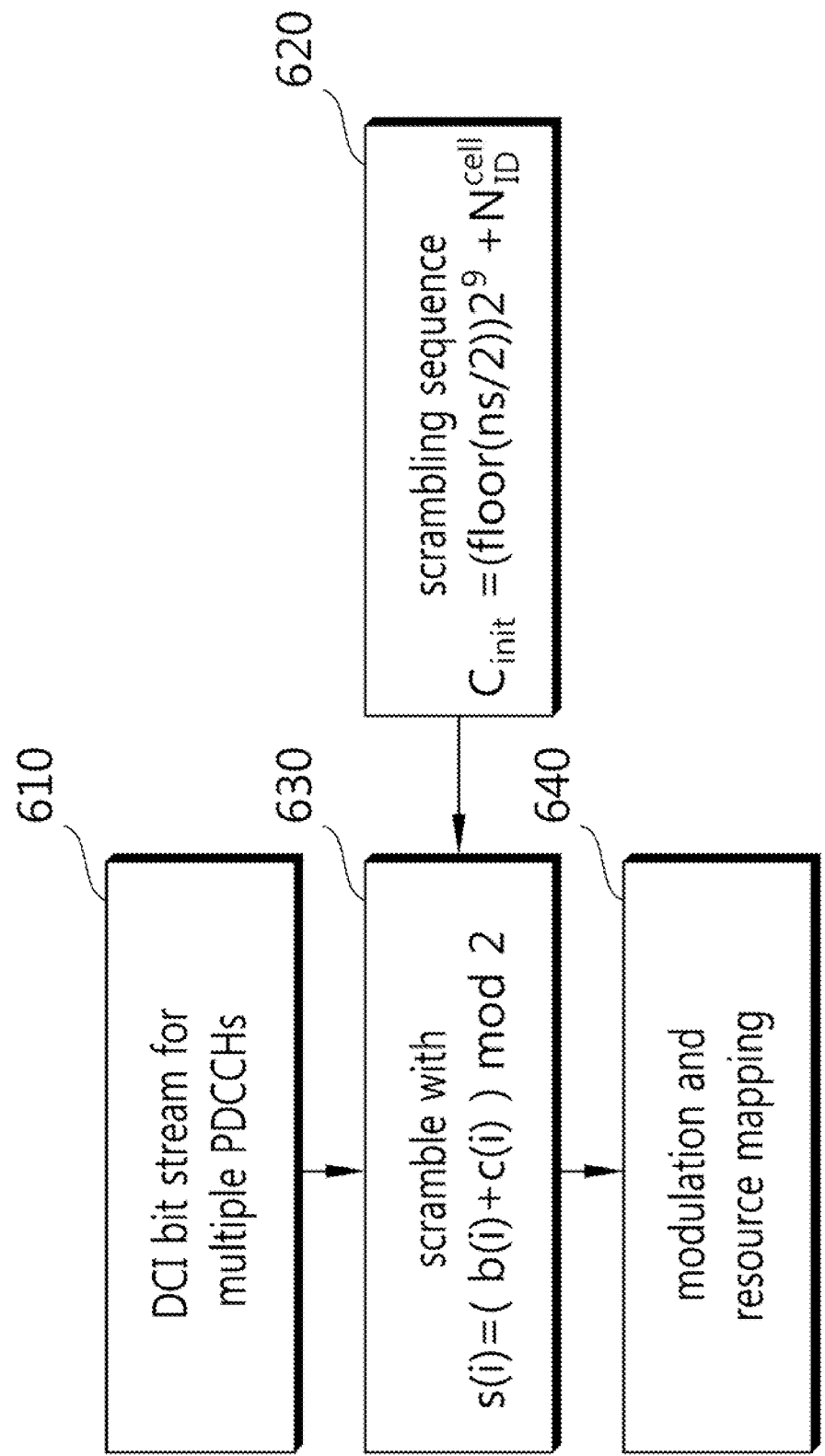
FIG. 6 shows generating and transmitting of a PDCCH in 3GPP LTE.

FIG. 6 shows generating and transmitting of a PDCCH in 3GPP LTE. The generating and transmitting of the PDCCH may be performed by a BS.

A DCI bit stream is generated according to a DCI format (block 610). Assume that a DCI bit block for a PDCCH index i to be transmitted in one subframe is $b^{(i)}(0), \ldots, b^{(i)}(M^{(i)}-1)$. $M^{(i)}$ denotes the number of bits of a DCI for the PDCCH index i. Herein, i=0, . . . , np−1. np denotes the number of PDCCHs transmitted in a corresponding subframe. One or more DCI bit blocks are aggregated to generate a DCI bit stream $b^{(0)}(0), \ldots, b^{(0)}(M^{(0)}-1), b^{(1)}(0), \ldots, b^{(1)}(M^{(1)}-1), \ldots, b^{(np-1)}(0), \ldots, b^{(np-1)}(M^{(np-1)}-1)$.

Next, a scrambling sequence of the PDCCH is generated (block 620). The scrambling sequence may be given by a pseudo-random sequence c(i) of Equation 2. A scrambling sequence generator may be initialized with $c_{init}=(\text{floor}(ns/2))2^9+N^{cell}_{ID}$ at a start point of each subframe. ns denotes a slot number in a radio frame, and $N^{cell}_{ID}$ denotes a physical cell identity (PCI). More specifically, in Equation 2, a first m-sequence may be initialized with $x_1(0)=1$, $x_1(n)=0$, m=1, 2, . . . , 30, and a second m-sequence may be initialized with $c_{init}=(\text{floor}(ns/2))2^9+N^{cell}_{ID}$ at a start point of each subframe.

The DCI bit stream may be scrambled as follows by using the scrambling sequence to generate a scrambled bit stream s(i) (block 630).

$$s(i)=(b(i)+c(i)) \mod 2 \quad \text{[Equation 3]}$$

The scrambled bit stream s(i) is transmitted through modulation and resource mapping (block 640).

According to the existing PDCCH structure, scrambling is achieved by using a cell-specific scrambling sequence generated on the basis of a cell ID, and the scrambling sequence is applied by multiplexing all PDCCHs transmitted in one subframe. This is because a resource region in which a search space is configured in one subframe is fixed to a specific region (i.e., a control region) in the subframe, and also one UE specific search space is defined in one wireless device.

However, it may not be easy to apply the aforementioned structure to an EPDCCH. A search space for the EPDCCH may be designated in any PRB (or a PRB pair) in a subframe, and also a plurality of EPDCCH search spaces may be defined. Hereinafter, the search space for the EPDCCH is referred to as an EPDCCH set.

Figure 7:
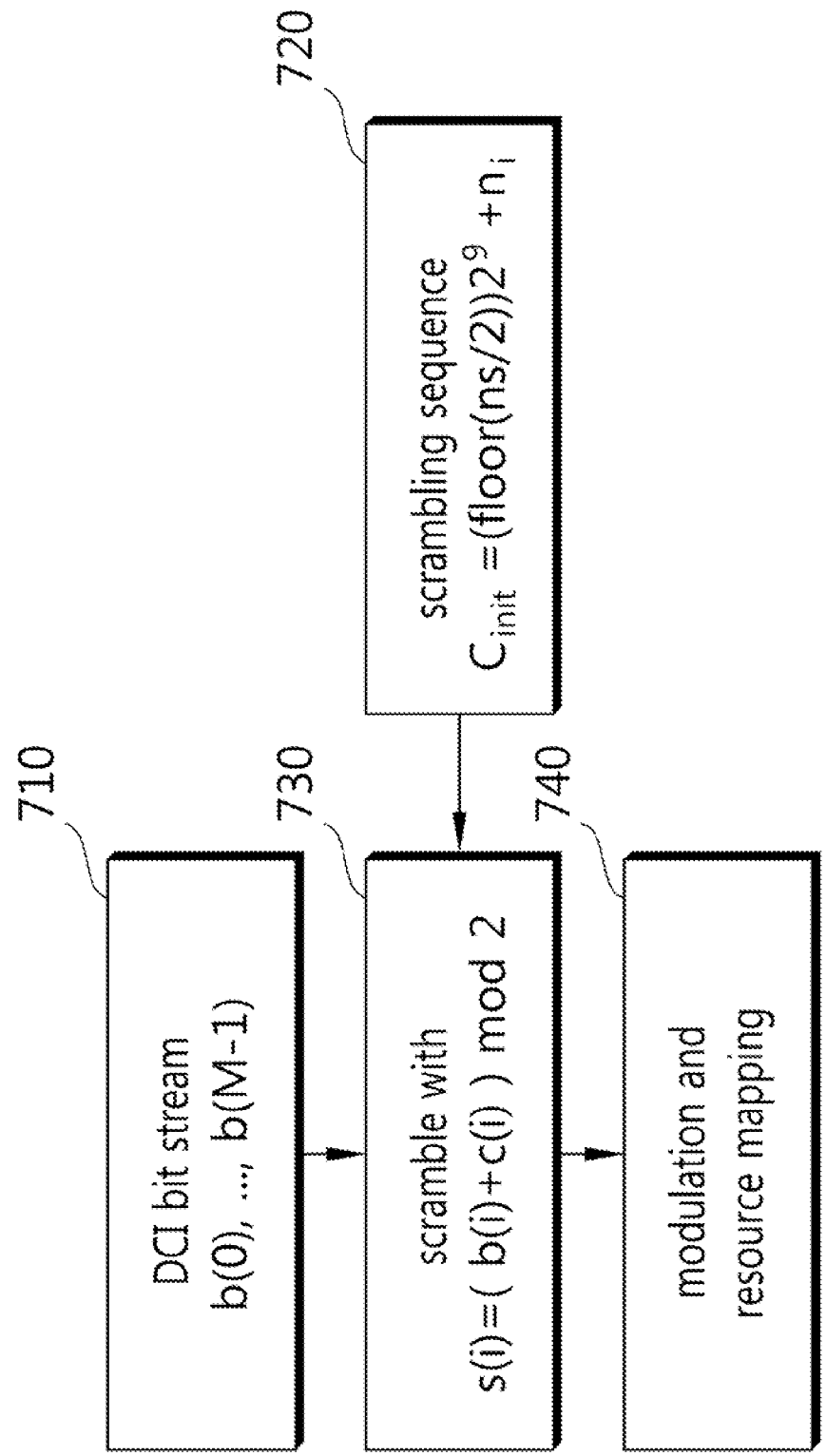
FIG. 7 shows generating and transmitting of an EPDCCH according to an embodiment of the present invention.

FIG. 7 shows generating and transmitting of an EPDCCH according to an embodiment of the present invention. The generating and transmitting of the EPDCCH may be performed by a BS.

A DCI bit stream is generated according to a DCI format (block 710). Assume that a DCI bit stream for an EPDCCH to be transmitted in one subframe is b(0), . . . , b(M−1). M denotes the number of bits of a DCI for a corresponding EPDCCH. The DCI bit stream may be given for each EPDCCH set.

Next, a scrambling sequence for the EPDCCH is generated (block 720). The scrambling sequence may be given by a pseudo-random sequence c(i) of Equation 2. A scrambling sequence generator may be initialized with $c_{init}=(\text{floor}(ns/2))2^9+n_i$ at a start point of each subframe. ns denotes a slot number in a radio frame, and $n^i$ denotes a parameter given for each wireless device or each EPDCCH set. More specifically, in Equation 2, a first m-sequence may be initialized with $x_1(0)=1$, $x_1(n)=0$, m=1, 2, . . . , 30, and a second m-sequence may be initialized with $c_{init}=(\text{floor}(ns/2))2^9+n_i$ at a start point of each subframe.

The parameter $n_i$ may be configured variously.

In one embodiment, the parameter $n_i$ may be a cell-specific parameter different from a PCI of a cell. This is called a virtual cell ID. The parameter $n_i$ may be the virtual cell ID or a value obtained from the virtual cell ID. The BS may report information regarding the virtual cell ID to the wireless device.

In another embodiment, the parameter $n_i$ may be a value given for each EPDCCH set. The parameter $n_i$ may be a value given for an EPDCCH set number i. Information regarding the parameter $n_i$ may be included in information for configuring the EPDCCH set.

In another embodiment, the parameter $n_i$ may be a value given according to a DCI format or an EPDCCH resource allocation. The parameter $n_i$ may be determined according to an ECCE index or an EREG index.

The DCI bit stream may be scrambled as shown in Equation 3 by using a scrambling sequence to generate a scrambled bit stream s(0), . . . , s(M−1) (block 730).

The scrambled bit stream s(0), . . . , s(M−1) is transmitted through modulation and resource mapping (block 740). The scrambled bit stream s(0), . . . , s(M−1) is modulated with quadrature phase shift keying (QPSK) to generate a modulation symbol d(0), . . . , $d(M_{sym}-1)$. $M_{sym}$ denotes the number of modulation symbols. The modulation symbol d(0), . . . , $d(M_{sym}-1)$ is transmitted by being mapped to an allocated radio resource.

According to the proposed embodiment, the EPDCCH is scrambled for each EPDCCH set or for each wireless device. In addition, instead of performing scrambling using one scrambling sequence by aggregating all PDCCHs transmitted in one subframe, scrambling is possible for each EPDCCH set. The wireless device may identify its EPDCCH for each EPDCCH set or for each wireless device.

Figure 8:
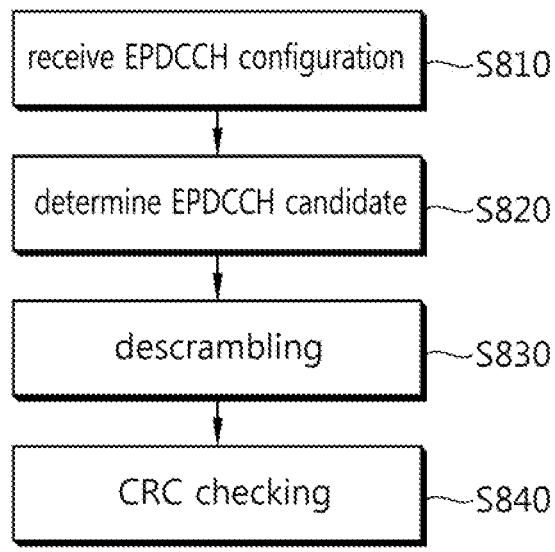
FIG. 8 shows a control channel monitoring method according to an embodiment of the present invention.

FIG. 8 is a flowchart showing a method of monitoring a control channel according to an embodiment of the present invention. This procedure may be performed by a wireless device.

In step S810, the wireless device receives an EPDCCH configuration from a BS. The EPDCCH configuration includes information regarding a subframe and resource for EPDCCH monitoring. The EPDCCH configuration may include information regarding one or more EPDCCH sets. For example, an example of an information element (IE) for one EPDCCH set may be as follows.

TABLE 1

EPDCCH-SetConfig ::= SEQUENCE {
  setConfigId,
  transmissionType          ENUMERATED {localised, distributed},
  resourceBlockAssignment   SEQUENCE{
                              numberPRB-Pairs
                              resourceBlockAssignment
},
ScramblingSequenceInt,
pucch-ResourceStartOffset,
...
}

'setConfigId' is an identifier of an EPDCCH set. 'transmissionType' indicates distributed transmission or localized transmission. 'resourceBlockAssignment' is information indicating a PRB pair for the EPDCCH set. 'ScramblingSequenceInt' is a value for initializing a scrambling sequence of the EPDCCH set. In the aforementioned embodiment, $n_i$ may be derived from 'ScramblingSequenceInt'. Alternatively, $n_{EPDCCH,SCID}$ which is an initialization value of a scrambling sequence for a DM RS for an EPDCCH may also be derived from 'ScramblingSequenceInt'. 'pucch-ResourceStartOffset' indicates a start offset value of a PUCCH format 1a/1b for the EPDCCH set.

The wireless device may monitor the EPDCCH on the basis of the configuration information. For example, assume that two EPDCCH sets are configured. The wireless device may monitor the EPDCCH in a PRB corresponding to a first EPDCCH, and may monitor the EPDCCH in a PRB corresponding to a second EPDCCH. For example, EPDCCH monitoring for an EPDCCH set p may include steps S820 to S830 described below.

In step S820, the wireless device may determine an ECCE corresponding to an EPDCCH candidate for the EPDCCH set p as follows.

$$L\left\{\left(Y_{p,k} + \text{floor}\left(\frac{mN_{ECCE,p,k}}{LM^L}\right) + b\right) \bmod \text{floor}\left(\frac{N_{ECCE,p,k}}{L}\right)\right\} + i \quad \text{[Equation 4]}$$

Herein, L denotes an aggregation level, $i=0, \ldots, L-1$, $m=0, \ldots, M^L-1$, $M^L$ denotes the number of EPDCCH candidates at an aggregation level, and $N_{ECCE,p,k}$ denotes the number of ECCEs at an EPDCCH p of a subframe k. b is a value of a carrier indicator field (CIF) (if the CIF is configured) or 0 (if the CIF is not configured). $Y_{p,k}$ denotes a variable derived on the basis of a C-RNTI of the wireless device.

In step S830, the wireless device demodulates a signal from ECCEs for an EPDCCH candidate, and descrambles the signal by using a scrambling sequence.

In step S840, the wireless device confirms a CRC from a descrambled bit stream. When there is no CRC error, it is recognized that the EPDCCH belongs to the wireless device.

As an additional embodiment, how to perform scrambling as to one or more EPDCCH sets after generating a scrambling sequence will be described hereinafter.

Figure 9:
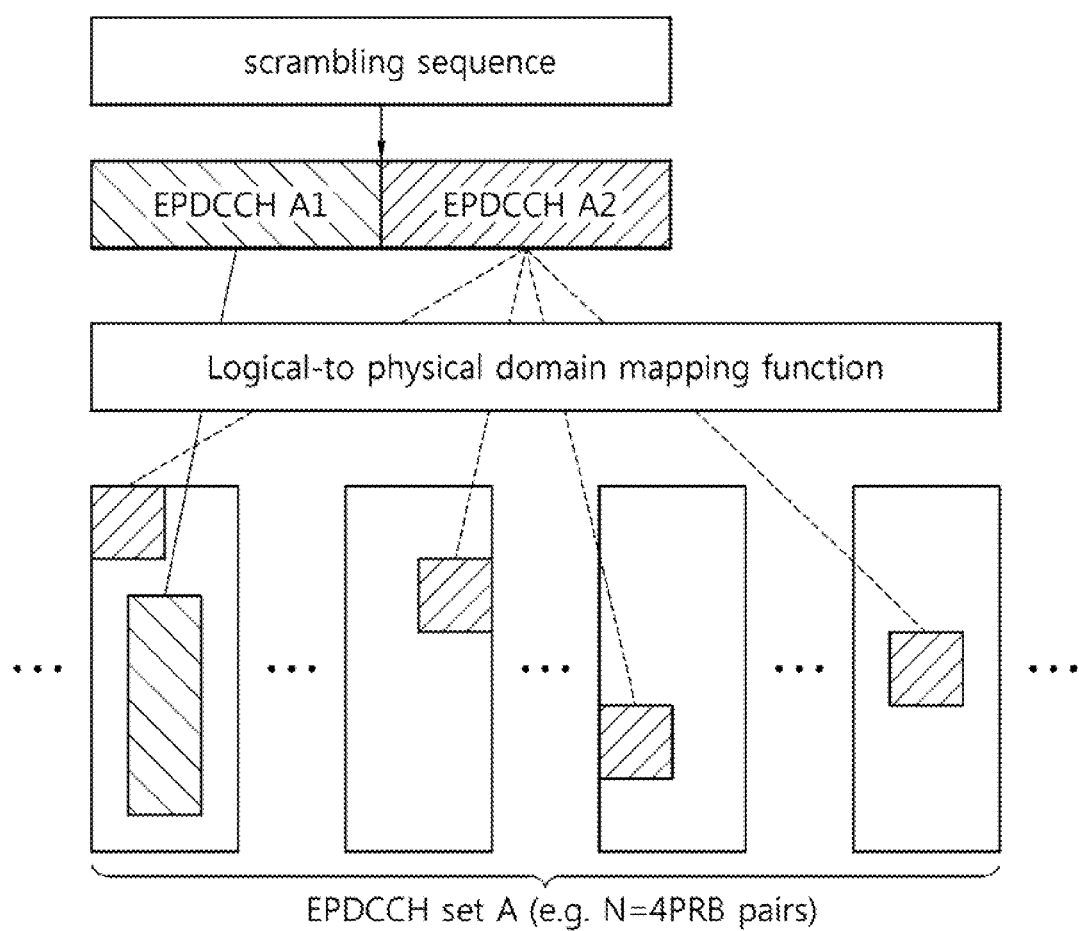
FIG. 9 shows scrambling according to an embodiment of the present invention.

FIG. 9 shows scrambling according to an embodiment of the present invention.

There are two EPDCCHs (i.e., EPDCCH A1, EPDCCH A2) in one EPDCCH set. The two EPDCCHs are concurrently scrambled by using one scrambling sequence.

The scrambling sequence may be generated for each EPDCCH set. Alternatively, one scrambling sequence may be used for scrambling of a plurality of EPDCCH sets.

Figure 10:
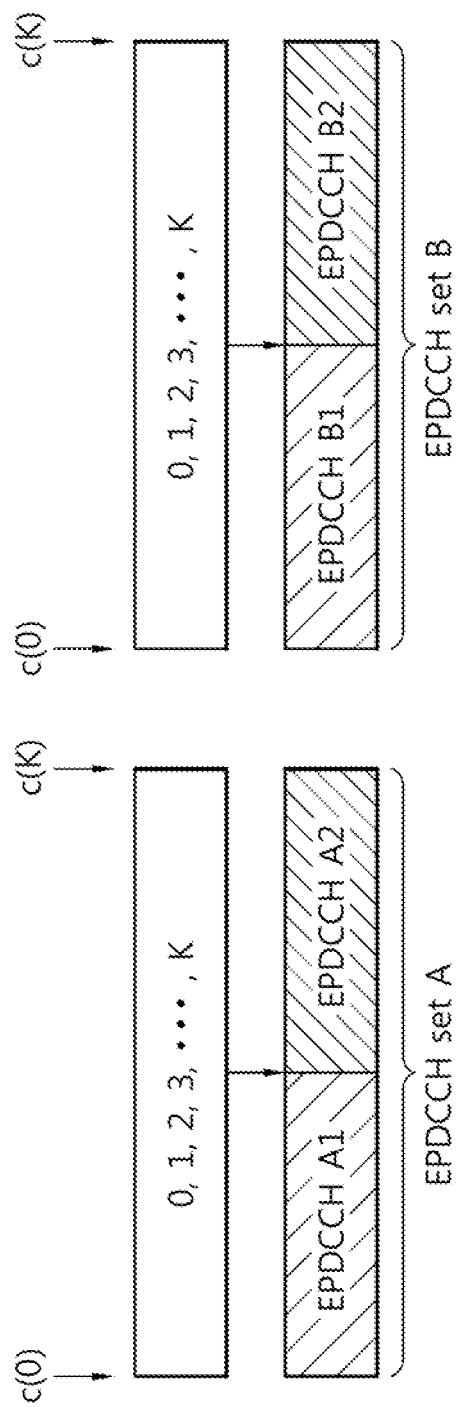
FIG. 10 shows an example of a scrambling sequence.

FIG. 10 shows an example of a scrambling sequence.

One scrambling sequence $c(0), \ldots, c(K)$ is generated, and thereafter it is used commonly in an EPDCCH set A and an EPDCCH set B. Each EPDCCH set may use a scrambling sequence having a different length.

Figure 11:
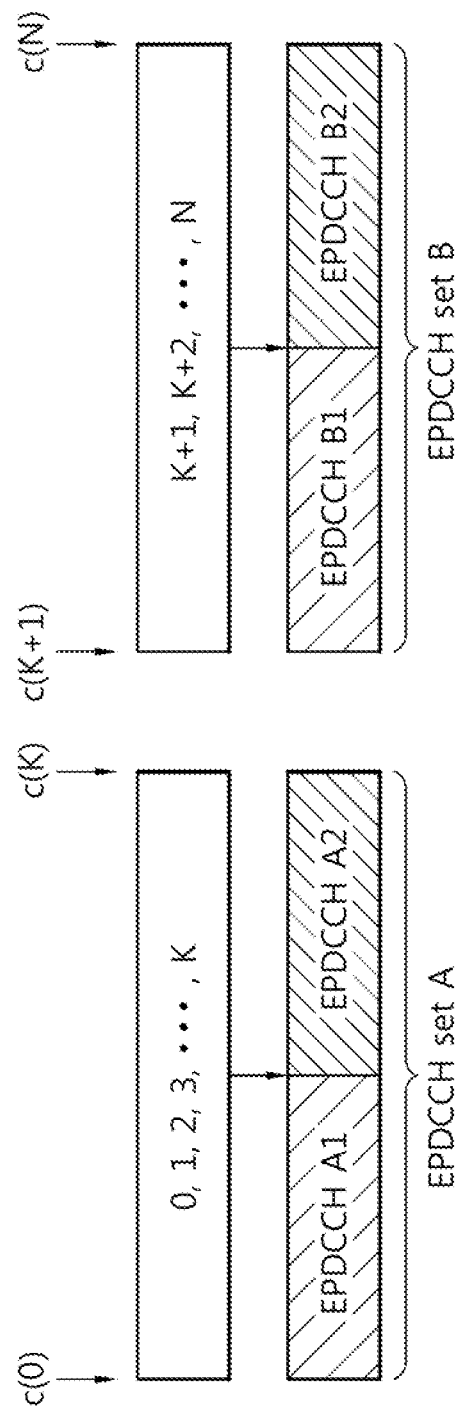
FIG. 11 shows another example of a scrambling sequence.

FIG. 11 shows another example of a scrambling sequence.

One long-scrambling sequence $c(0), \ldots, c(N)$ is generated and then is divided to be used for each EPDCCH set. For example, the scrambling sequence $c(0), \ldots, c(K)$ is used in scrambling of the EPDCCH set A, and a scrambling sequence $c(K+1), \ldots, c(N)$ is used in scrambling of the EPDCCH set B.

Figure 12:
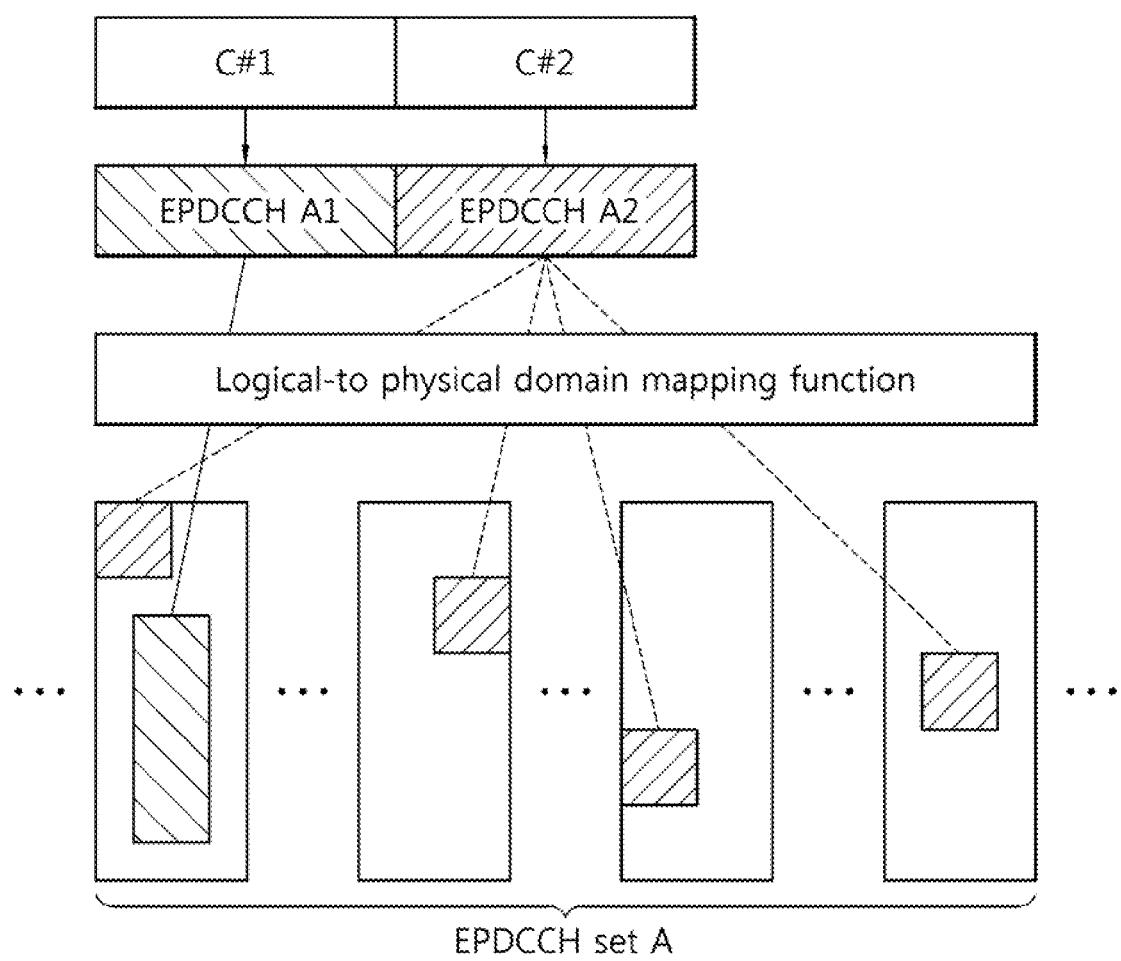
FIG. 12 shows scrambling according to another embodiment of the present invention.

FIG. 12 shows scrambling according to another embodiment of the present invention.

Comparing with the embodiment of FIG. 9, a scrambling sequence is applied for each EPDCCH in one EPDCCH set. For example, an EPDCCH set A has two EPDCCHs (i.e., EPDCCH A1, EPDCCH A2), and two scrambling sequences are generated. A scrambling sequence C#1 is used in scrambling of the EPDCCH A1, and a scrambling sequence C#2 is used in scrambling of the EPDCCH A2.

When a scrambling sequence is generated for all EPDCCHs in a plurality of EPDCCH sets, it may cause a memory overhead. Therefore, the scrambling sequence may be generated according to the maximum number of EPDCCHs among the plurality of EPDCCH sets.

Figure 13:
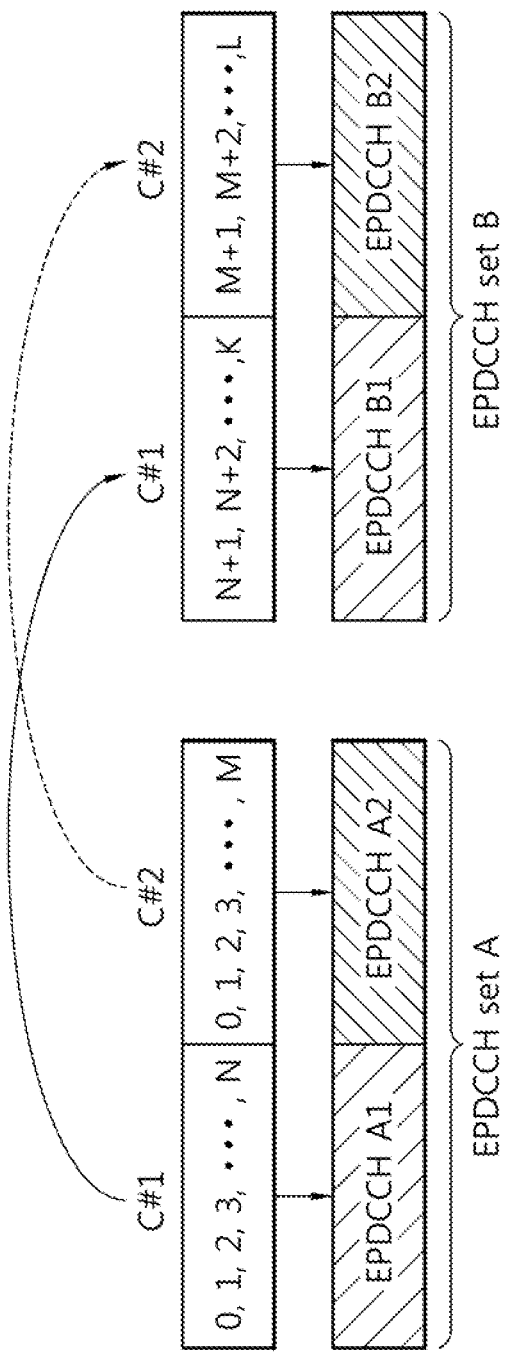
FIG. 13 shows an example of a scrambling sequence.

FIG. 13 shows an example of a scrambling sequence.

There are two EPDCCHs in each of two EPDCCH sets. Two scrambling sequences corresponding to the two EPDCCHs are generated. A first scrambling sequence is used in scrambling of an EPDCCH A1 of an EPDCCH set A and an EPDCCH B1 of an EPDCCH set B. A second scrambling sequence is used in scrambling of an EPDCCH A2 of the EPDCCH set A and an EPDCCH B2 of the EPDCCH set B.

Figure 14:
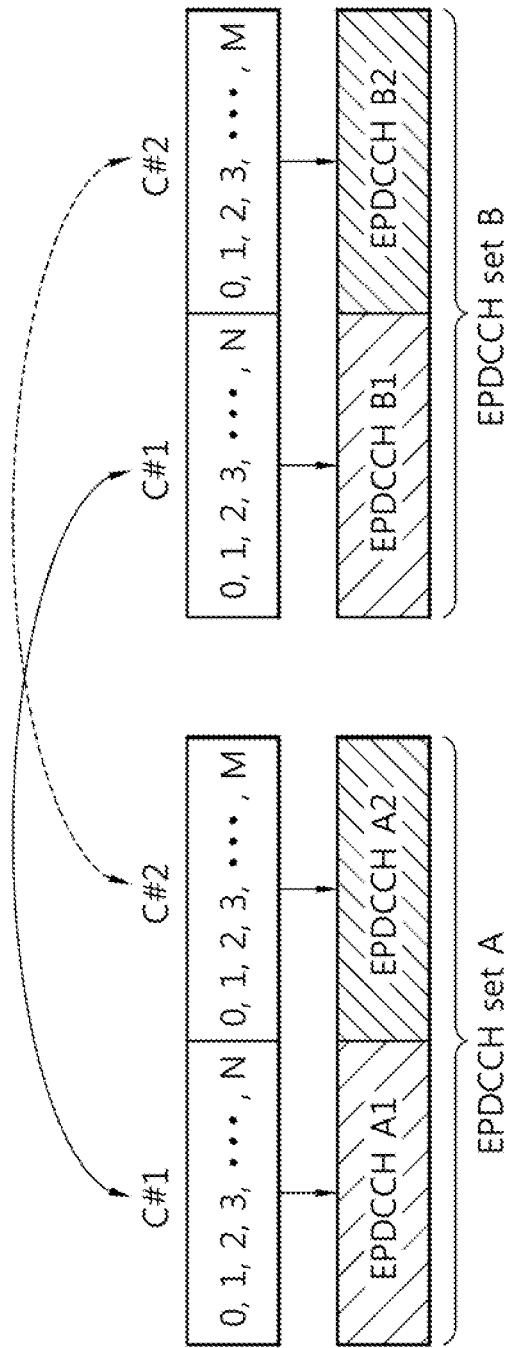
FIG. 14 shows another example of a scrambling sequence.

FIG. 14 shows another example of a scrambling sequence.

Two scrambling sequences corresponding to two EPDCCHs are generated. A first scrambling sequence is used in scrambling of each of an EPDCH A1 and EPDCCH A2 of an EPDCCH A. A second scrambling sequence is used in scrambling of each of an EPDCH B1 and EPDCCH B2 of an EPDCCH B.

In addition to the aforementioned embodiment, it may be considered a case where SU-MIMO transmission is performed on an EPDCCH. For example, if the EPDCCH is transmitted through two layers, how to distribute a scrambling sequence to the two layers is a matter to be considered. In one embodiment, a scrambling sequence $c(0), \ldots, c(N)$ may be allocated sequentially to each layer. For example, $c(n)$ may be allocated to a first layer, and $c(2n+1)$ may be allocated to a second layer. In another embodiment, the scrambling sequence may be allocated in a divided manner to a plurality of layers. The scrambling sequence $c(0), \ldots, c(N)$ may be divided into two sequences, i.e., a sequence $c(0), \ldots, c(K)$ and a sequence $c(K+1), \ldots, c(N)$. The first scrambling sequence may be allocated to the first layer, and the second scrambling sequence may be allocated to the second layer.

Figure 15:
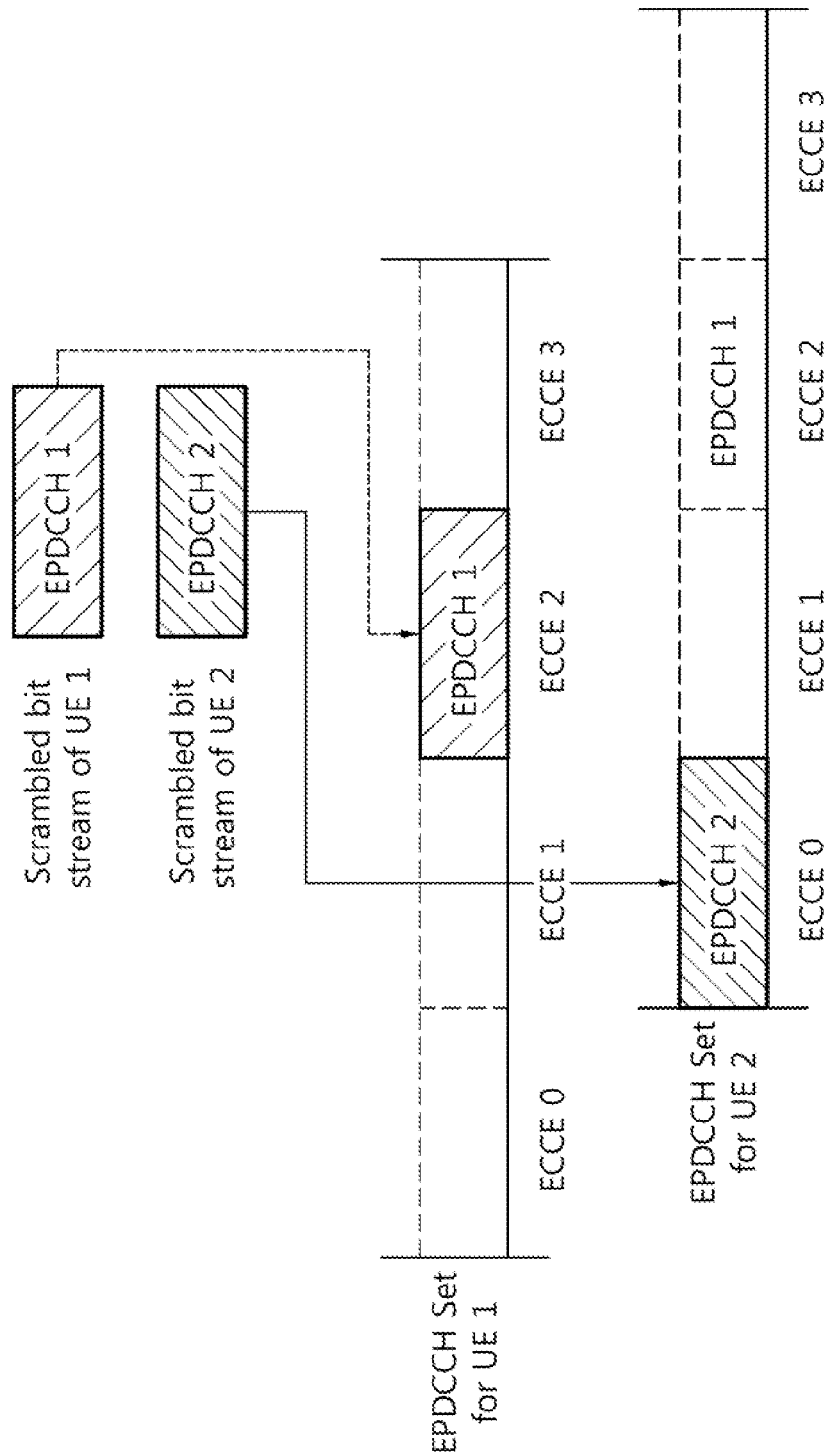
FIG. 15 shows an EPDCCH scramble according to an embodiment of the present invention.

FIG. 15 shows an EPDCCH scramble according to an embodiment of the present invention.

An EPDCCH is scrambled for each EPDCCH set. A scrambling sequence for an EPDCCH set for a UE1 is generated, and the generated scrambling sequence is applied to a corresponding EPDCCH1. A scrambling sequence for an EPDCCH set for a UE2 is generated, and the generated scrambling sequence is applied to a corresponding EPDCCH2.

Although it is shown that each of the EPDCCH1 and the EPDCCH2 is mapped to one ECCE, the location or the number of ECCEs is for exemplary purposes only.

Figure 16:
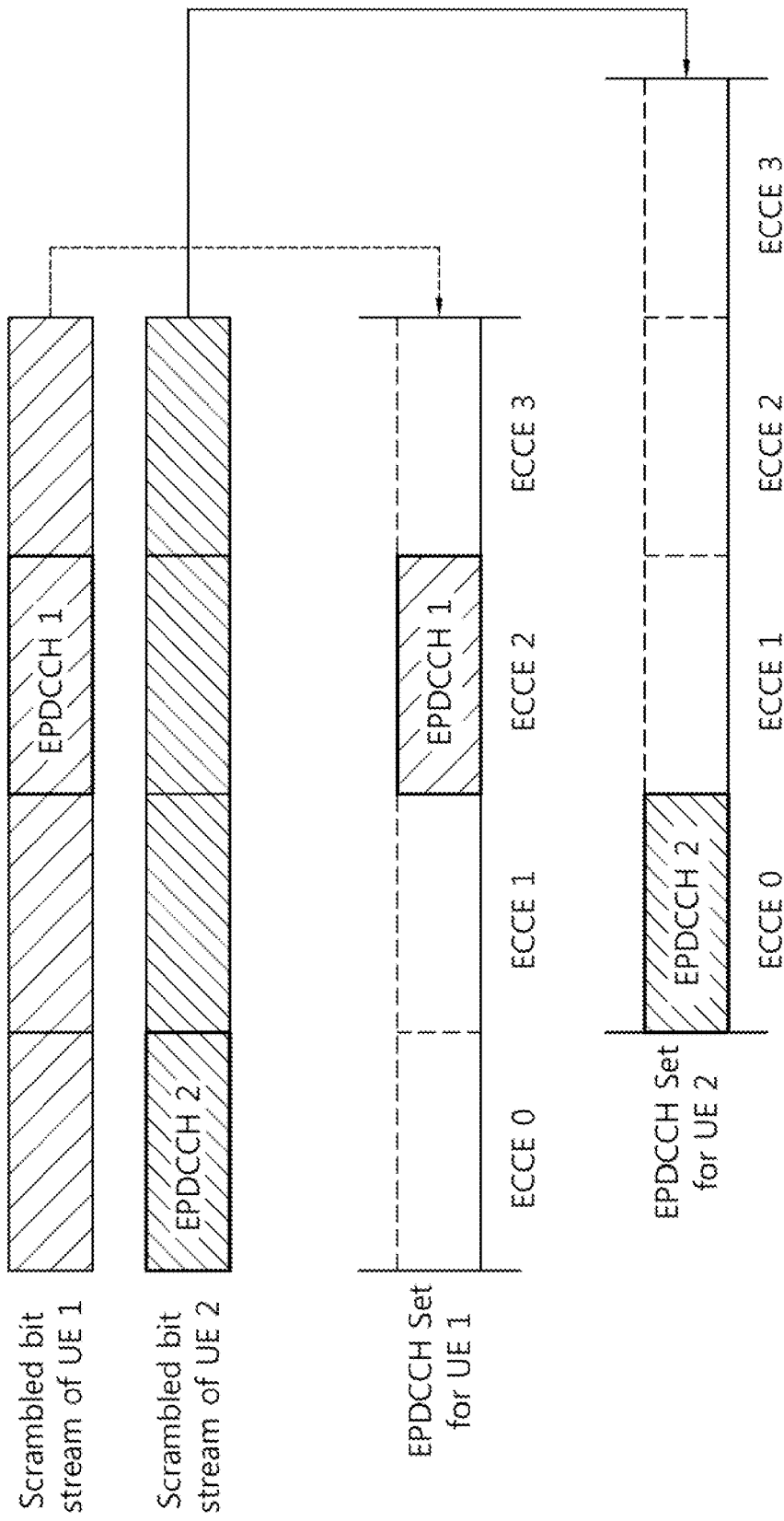
FIG. 16 shows an EPDCCH scramble according to another embodiment of the present invention.

FIG. 16 shows an EPDCCH scramble according to another embodiment of the present invention.

According to this embodiment, a scrambling sequence is generated as if it is applied to all corresponding EPDCCH sets. In addition, a start point at which the scrambling sequence is applied may be determined according to an ECCE index to which an EPDCCH is mapped. The embodiment of FIG. 15 is an example in which the same scrambling sequence is applied irrespective of a location of the EPDCCH. The embodiment of FIG. 16 is an example in which the scrambling sequence is determined according to the location of the EPDCCH.

For example, an EPDCCH set consists of 4 ECCEs, and a reference scrambling sequence $c(0), \ldots, c(N)$ is generated for all of them. In addition, when an EPDCCH1 is mapped to an ECCE2, a start point n of a scrambling sequence corresponding to the ECCE2 may be discovered. Therefore, a scrambling sequence $c(n), \ldots, c(R+n)$ is applied to the EPDCCH1. R denotes a length of a scrambling sequence corresponding to one ECCE.

Upon detection of the EPDCCH1, a wireless device may know an ECCE index of an ECCE in which the EPDCCH1 is detected, and thus may discover a scrambling sequence.

In order to obtain a scrambling sequence applied to the EPDCCH in practice from a long scrambling sequence, not only an ECCE index but also an index, an identifier, or a combination of them may be used. A BS may report information used to determine a scrambling sequence of each EPDCCH to the wireless device.

Figure 17:
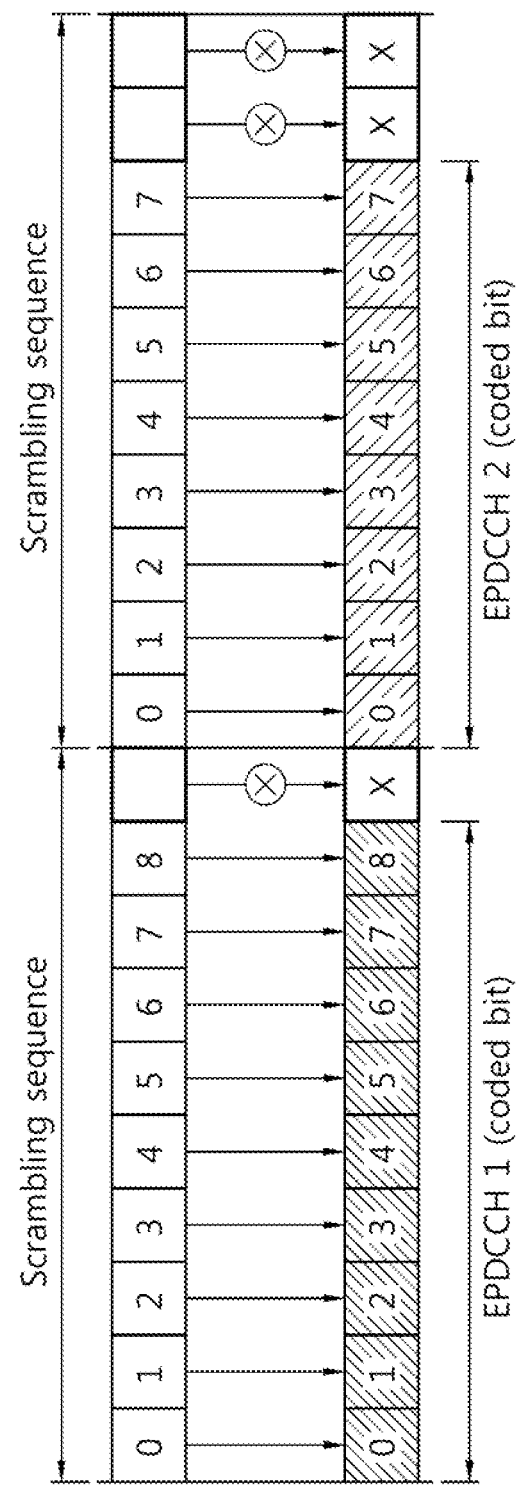
FIG. 17 shows an example of applying scrambling to an EPDCCH.

FIG. 17 shows an example of applying scrambling to an EPDCCH.

An EPDCCH set has two EPDCCHs, and the same scrambling sequence is applied to each EPDCCH. Alternatively, a scrambling sequence may be generated for each EPDCCH, so that a scrambling sequence #1 is applied to an EPDCCH1 and a scrambling sequence #2 is applied to an EPDCCH2.

Unlike a PDCCH, in the EPDCCH, rate matching is performed on an RE for different signals such as a CRS and a CSI-RS within a corresponding PRB pair. Therefore, the number of bits of a DCI may differ even if the DCI has the same aggregation level. In the figure, it is shown an example in which the number of DCI bits of the EPDCCH1 is 9, and the number of DCI bits of the EPDCCH2 is 9. Since each DCI uses one scrambling sequence, a corresponding scrambling sequence is applied from a first bit.

Figure 18:
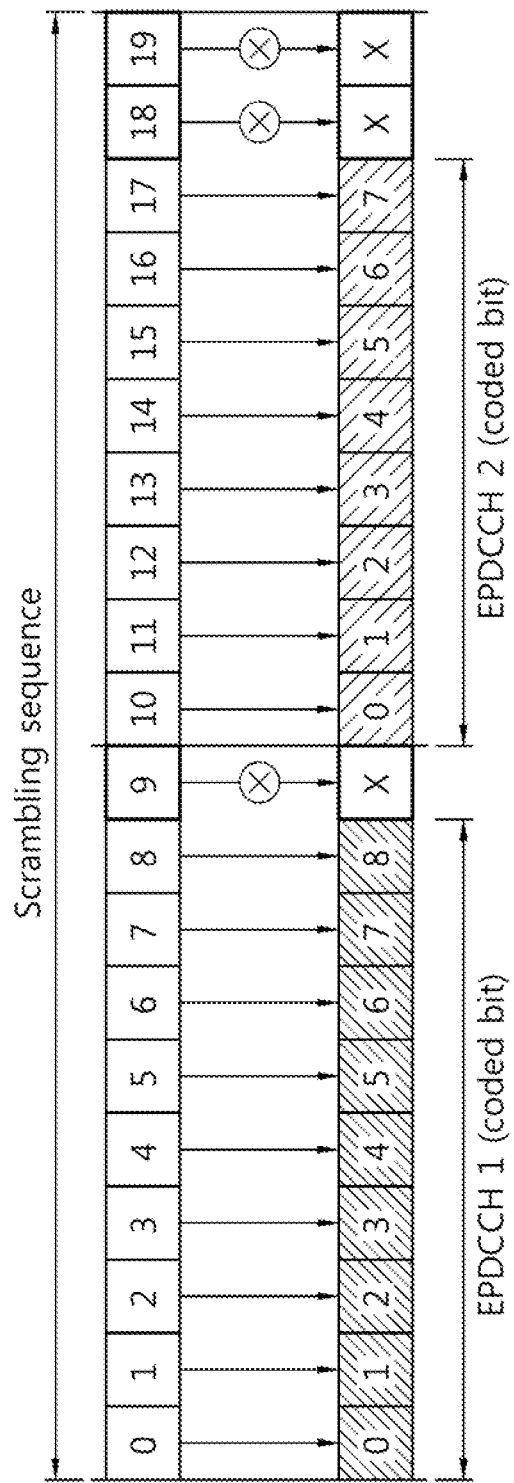
FIG. 18 shows another example of applying scrambling to an EPDCCH.

FIG. 18 shows another example of applying scrambling to an EPDCCH.

An example of applying one scrambling sequence to a plurality of EPDCCHs in an EPDCCH set is shown herein. However, a case where a DCI is rate-matched is a matter to be considered.

This embodiment proposes to skip an element of a scrambling sequence corresponding to the number of bits if an EPDCCH is rate-matched.

If one bit is rate-matched in an EPDCCH1, a $9^{th}$ element of a scrambling sequence corresponding thereto is skipped, and elements starting from a $10^{th}$ element of the scrambled sequence are applied to an EPDCCH2.

An element index of a scrambling sequence applied to a first bit of a DCI of each EPDCCH may be predetermined. The element index of the scrambling sequence applied to the first bit of each DCI may be defined according to a DCI having a maximum coded bit number among a plurality of DCIs. More specifically, assume that Q denotes a maximum value of the coded bit number that can be transmitted by one ECCE in a subframe k. A scrambling sequence $c(n*Q), c(n*Q+1), \ldots, c(n*Q+M-1)$ is applied to a DCI bit stream $b(0), b(1), \ldots, b(M-1)$ mapped starting from an ECCE index n.

Figure 19:
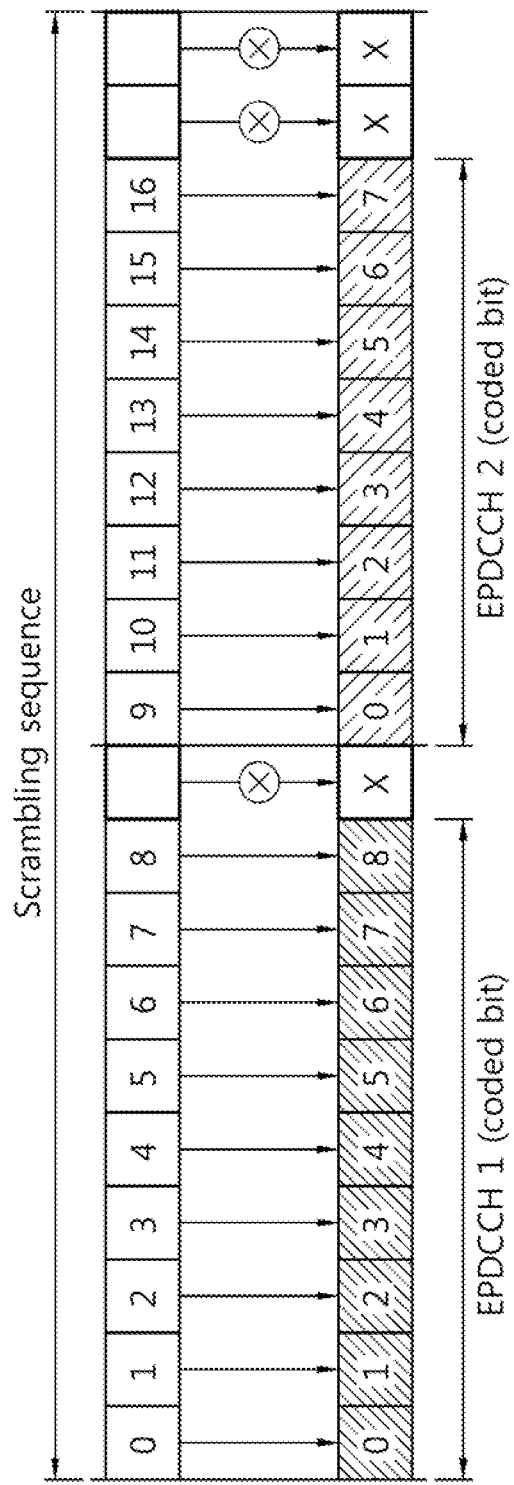
FIG. 19 shows another example of applying scrambling to an EPDCCH.

FIG. 19 shows another example of applying scrambling to an EPDCCH.

In comparison with the embodiment of FIG. 18, even if the EPDCCH is rate-matched, elements of a scrambling sequence are continuously applied. Bit streams for a plurality of EPDCCHs are combined, and one scrambling sequence is applied to the combined bit stream.

Although the embodiment of FIG. 17 to FIG. 19 is described based on an EPDCCH (or DCI), scrambling may be performed in unit of allocating a control channel (e.g., ECCE). For example, a scrambling sequence may be generated in unit of the ECCE, and the scrambling sequence may be applied to a bit stream corresponding to each ECCE. As a scrambling sequence, one identical sequence may be applied to each ECCE. Alternatively, the scrambling sequence may be generated for each ECCE. For example, the scrambling sequence may be generated by being initialized on the basis of an ECCE index.

Figure 20:
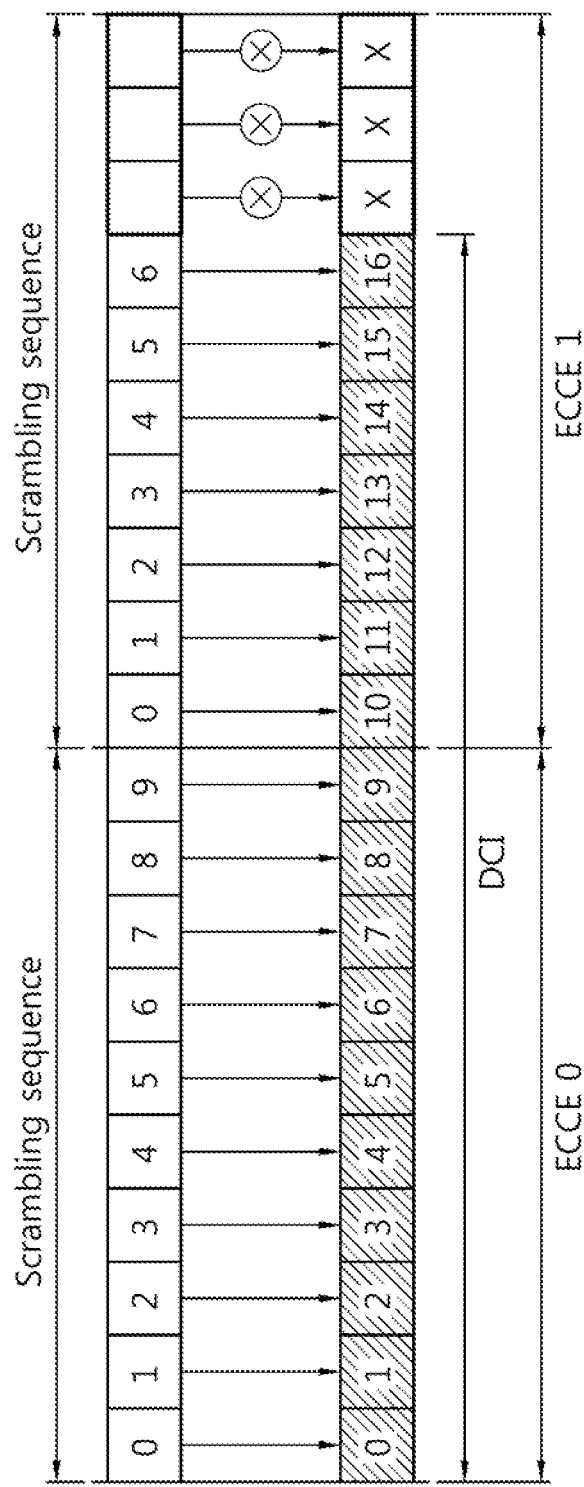
FIG. 20, FIG. 21, and FIG. 22 show another example of applying scrambling to an EPDCCH.
Figure 21:
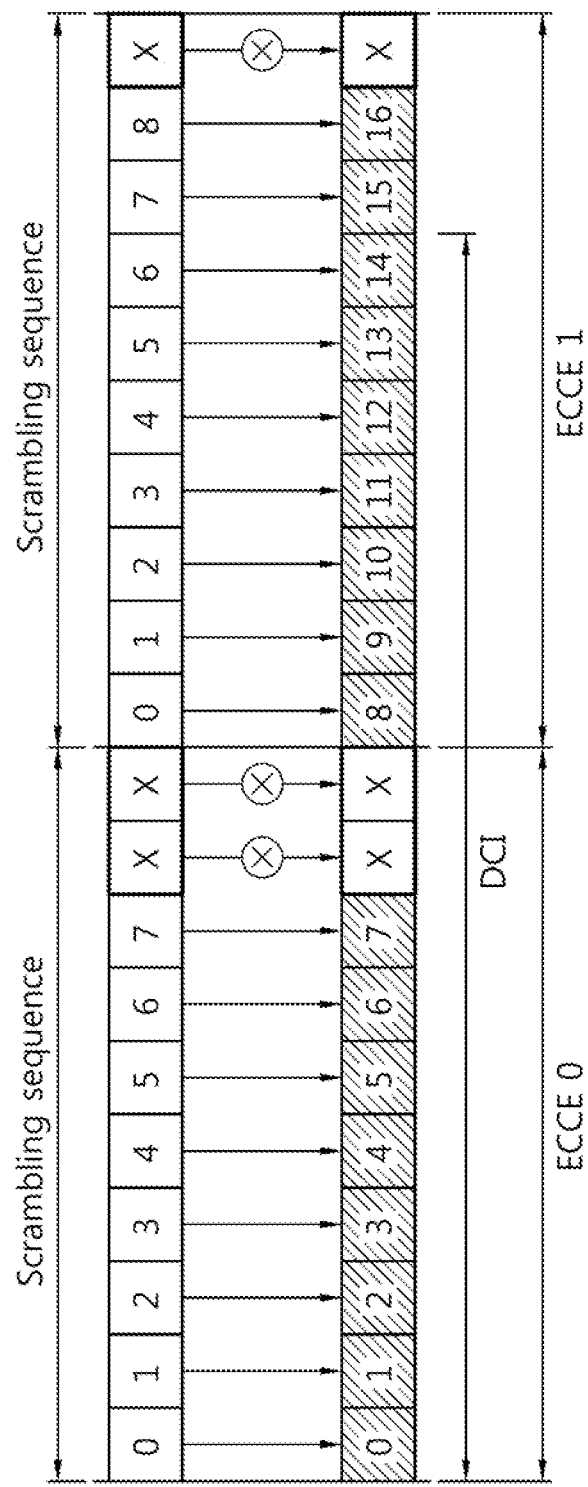
Figure 22:
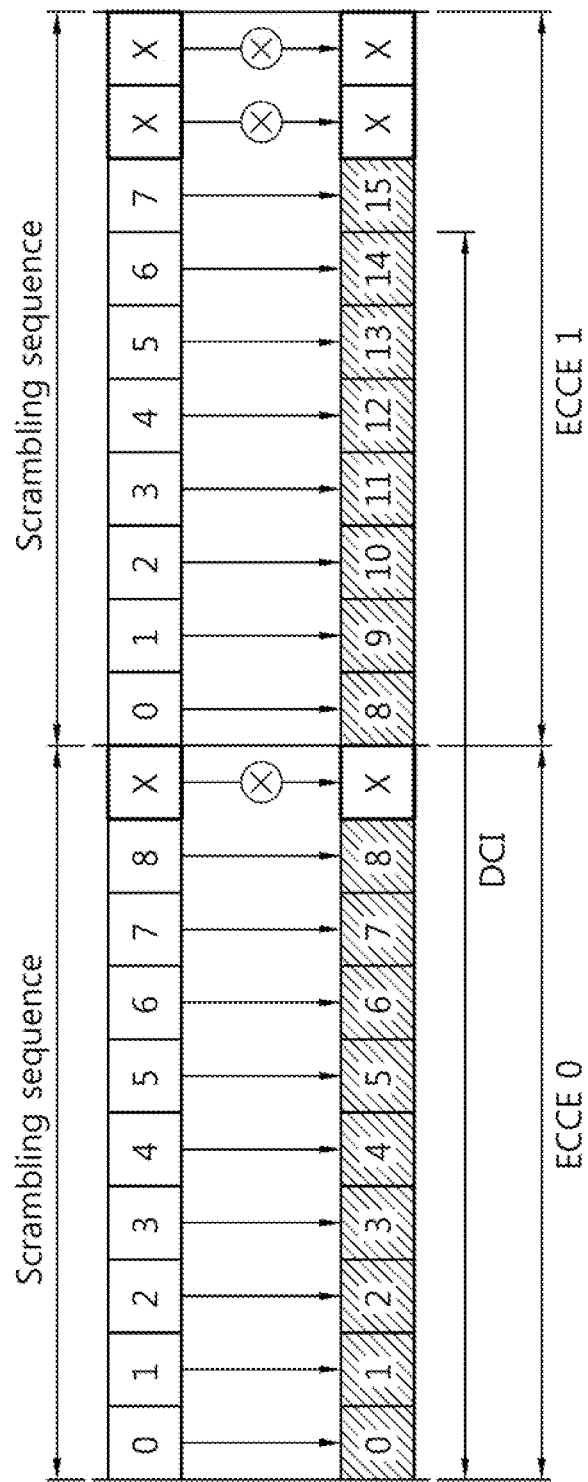

FIG. 20, FIG. 21, and FIG. 22 show another example of applying scrambling to an EPDCCH.

Although an EPDCCH with an aggregation level 2 is considered herein, there is no limitation in an aggregation level size. A scrambling sequence is applied to each of an ECCE0 and an ECCE1.

If the EPDCCH is rate-matched, from which ECCE a decreased bit length is excluded is a matter to be considered.

The example of FIG. 20 is an example in which the EPDCCH is rate-matched, and scrambling is performed by excluding three unusable bits from a last ECCE.

In the example of FIG. 21, distribution is evenly achieved to a plurality of ECCEs under the assumption that the number of unusable bits is P. In this case, if P is an odd number, the remaining bits are excluded from a first ECCE. In the example of FIG. 22, if P is an odd number, the remaining bits are excluded from a last ECCE.

Figure 23:
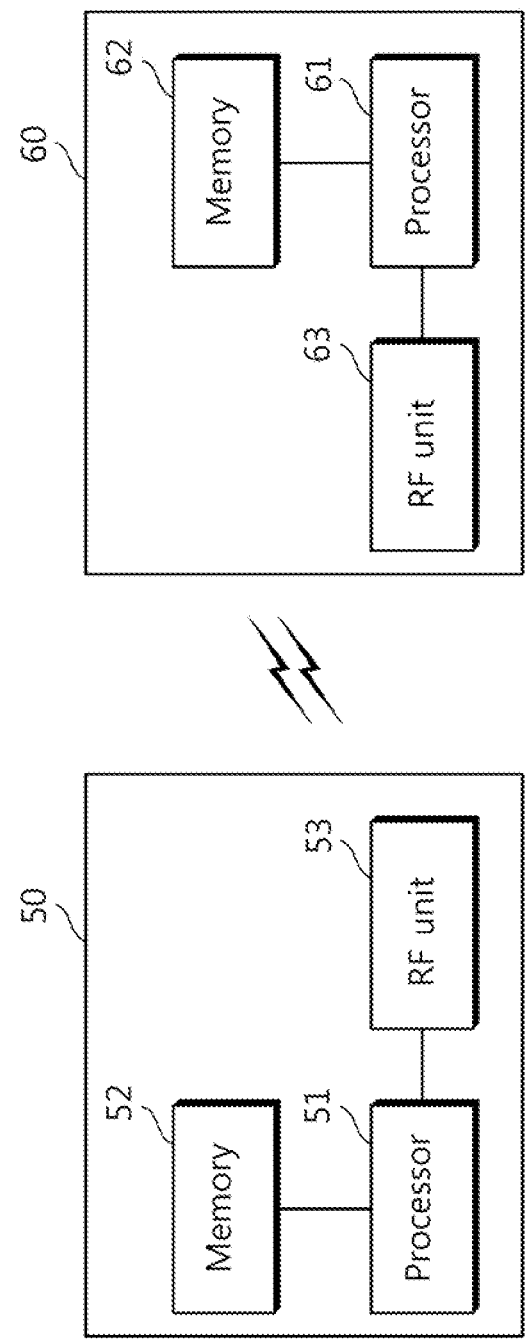
FIG. 23 is a block diagram showing a wireless communication system according to an embodiment of the present invention.

FIG. 23 is a block diagram of a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, procedures, and/or methods. In the aforementioned embodiment, an operation of the BS may be implemented by the processor 51. The processor 51 may configure a search space for an EPDCCH and/or an EPCFICH, and may transmit the EPDCCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61. The processor 61 may monitor an EPDDCH in a search space.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for monitoring a control channel in a wireless communication system, the method comprising:
    receiving, by the wireless device, configuration information to configure an enhanced physical downlink control channel (EPDCCH) set from a base station, the configuration information including a resource assignment indicating at least one physical resource block-pair and scrambling initialization information indicating a scrambling initialization value,
    wherein the configuration information further includes an identifier of the EPDCCH set;
    monitoring, by a wireless device, a downlink control channel in the EPDCCH set;
    generating, by the wireless device, a scrambling sequence; and
    descrambling, by the wireless device, a bit stream for downlink control information on the downlink control channel with the scrambling sequence,
    wherein the generation of the scrambling sequence is initialized with $C_{init}=(\text{floor}(ns/2))2^9+n_i$, where ns denotes a slot number within a radio frame, floor (x) denotes a largest integer not greater than x, and $n_i$ denotes the scrambling initialization value assigned for the EPDCCH set.

2. The method of claim 1, wherein the scrambling sequence is obtained from a pseudo-random sequence.

3. The method of claim 2, wherein the pseudo-random sequence is defined by:

$$c(n)=(x_1(n+Nc)+x_2(n+Nc)) \mod 2$$

$$x_1(n+31)=(x_1(n+3)+x_1(n)) \mod 2$$

$$x_2(n+31)=(x_2(n+3)+x_2(n+2)+x_2(n+1)+x_2(n)) \mod 2$$

where Nc=1600, n=0, . . . , N−1, and N denotes a length of the pseudo-random sequence.

4. The method of claim 1, wherein the bit stream b(i) for the downlink control information on the downlink control channel is scrambled with the scrambling sequence c(i) according to (b(i)+c(i) mod 2.

5. The method of claim 1, wherein the step of monitoring the downlink control channel includes:
    demodulating the downlink control information on the downlink control channel to obtain the bit stream for the downlink control information.

6. The method of claim 1, wherein the bit stream for the downlink control information has a cyclic redundancy check (CRC) that is scrambled with an identifier of the wireless device.

7. The method of claim 1, wherein the scrambling initialization value indicated by $n_i$ is different from a physical cell identity.

8. The method of claim 1, wherein the scrambling initialization value is received per the EPDCCH set.

9. A device configured to monitor a control channel in a wireless communication system, the device comprising:
    a processor; and
    a radio frequency (RF) unit configured to receive configuration information to configure an enhanced physical downlink control channel (EPDCCH) set from a base station, the configuration information including a resource assignment indicating at least one physical resource block-pair and scrambling initialization information indicating a scrambling initialization value,
    wherein the configuration information further includes an identifier of the EPDCCH set; and
    a memory operatively coupled with the processor and storing instructions that, when executed by the processor, cause the device to monitor a downlink control channel in the EPDCCH set,
    wherein the processor is configured to generate a scrambling sequence and descramble a bit stream for downlink control information on the downlink control channel with the scrambling sequence, and
    wherein the processor initializes the generation of the scrambling sequence with $c_{init}=(\text{floor }(ns/2))2^9+n_i$, where ns denotes a slot number within a radio frame, floor (x) denotes a largest integer not greater than x, and $n_i$ denotes a the scrambling initialization value assigned for the EPDCCH set.

10. The device of claim 9, wherein the scrambling sequence is obtained from a pseudo-random sequence.

11. A method for transmitting downlink control information in a wireless communication system, performed by a base station, the method comprising:
    transmitting configuration information to configure an enhanced physical downlink control channel (EPDCCH) set to a user equipment, the configuration information including a resource assignment indicating at least one physical resource block-pair and scrambling initialization information indicating a scrambling initialization value, wherein the configuration information further includes an identifier of the EPDCCH set;

generating a bit stream for the downlink control information;

generating a scrambling sequence;

scrambling the bit stream for the downlink control information with the scrambling sequence; and transmitting the scrambled bit stream in the EPDCHH set, wherein the generation of the scrambling sequence is initialized with $c_{init}=(floor(ns/2))2^9+n_i$, where ns denotes a slot number within a radio frame, floor (x) denotes a largest integer not greater than x, and $n_i$ denotes the scrambling initialization value assigned for the EPDCCH set.

12. The method of claim 11, wherein the scrambling sequence is generated from a pseudo-random sequence.

* * * * *